J. E. DUNGAN.
MACHINE FOR DISPENSING SEMISOLID SUBSTANCES.
APPLICATION FILED NOV. 15, 1919.
1,384,310.
Patented July 12, 1921.
5 SHEETS—SHEET 2.
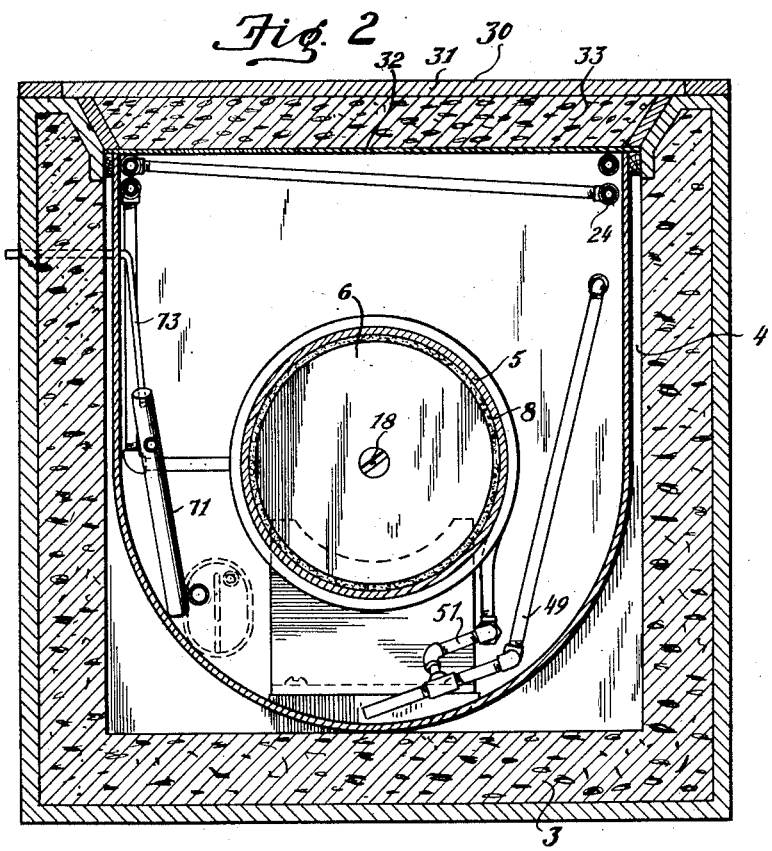
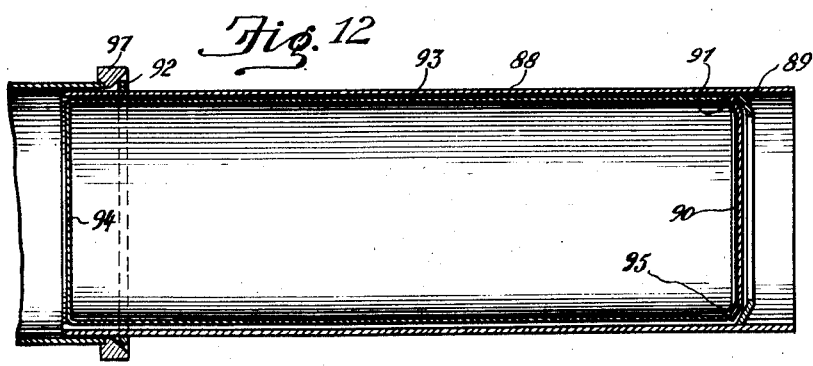
INVENTOR
John E. Dungan
BY: *Treau, Merkel, Laywelling Bad*
ATTYS.

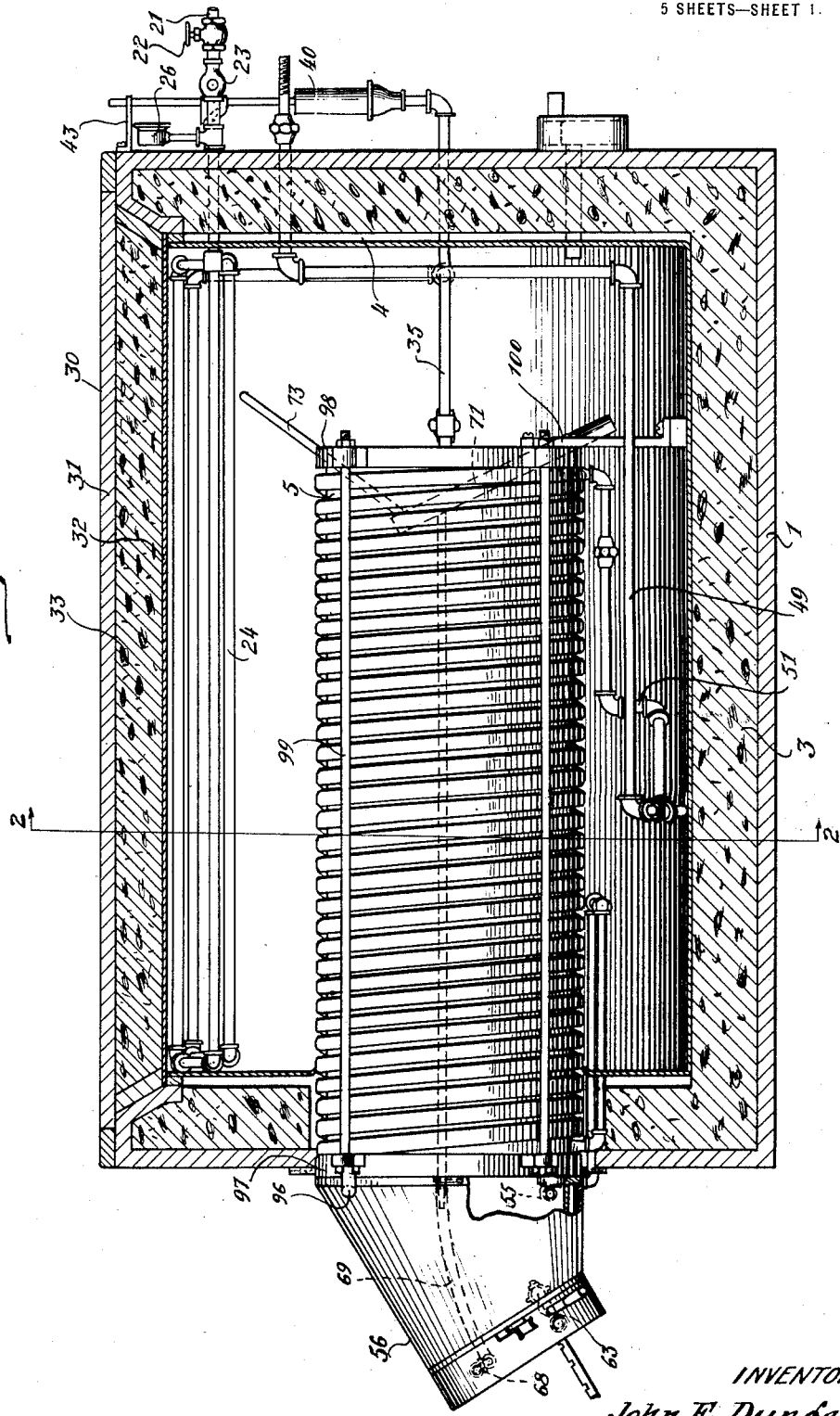

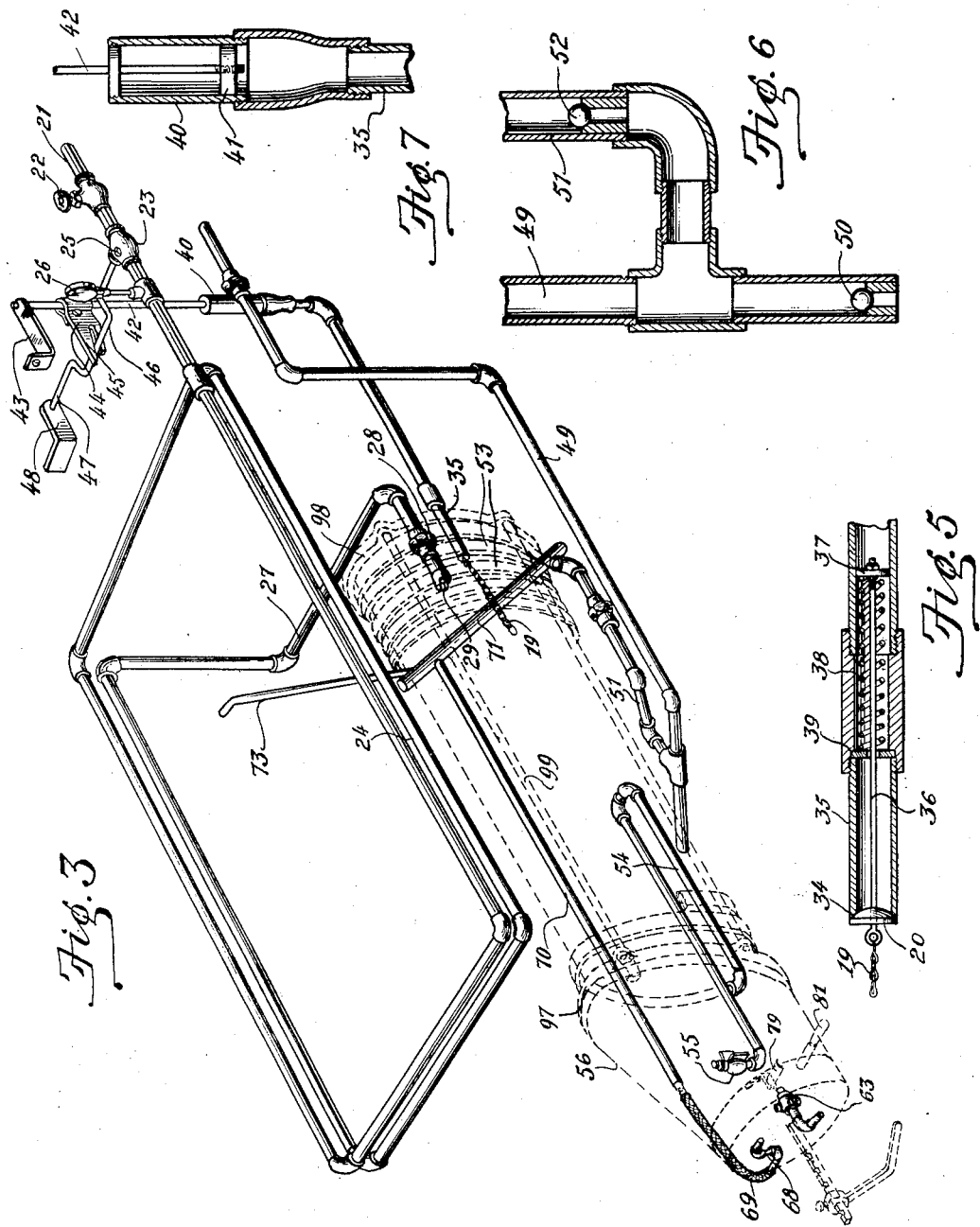

J. E. DUNGAN.
MACHINE FOR DISPENSING SEMISOLID SUBSTANCES.
APPLICATION FILED NOV. 15, 1919.
1,384,310.
Patented July 12, 1921.
5 SHEETS—SHEET 4.
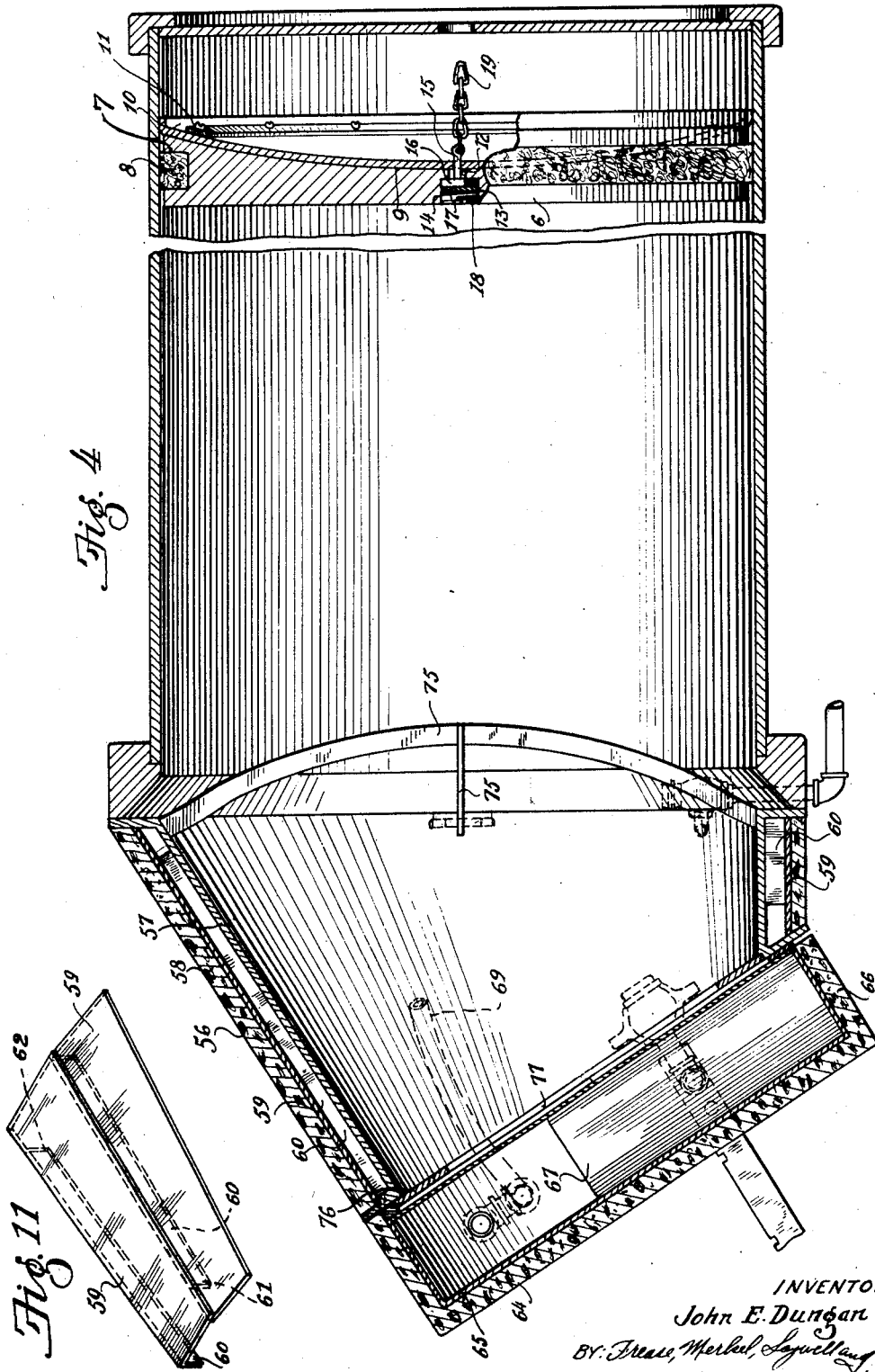
INVENTOR
John E. Dungan
BY: Freas, Merkel, Lequillan Bond
ATTYS.

J. E. DUNGAN.
MACHINE FOR DISPENSING SEMISOLID SUBSTANCES.
APPLICATION FILED NOV. 15, 1919.
1,384,310.
Patented July 12, 1921.
5 SHEETS—SHEET 5.
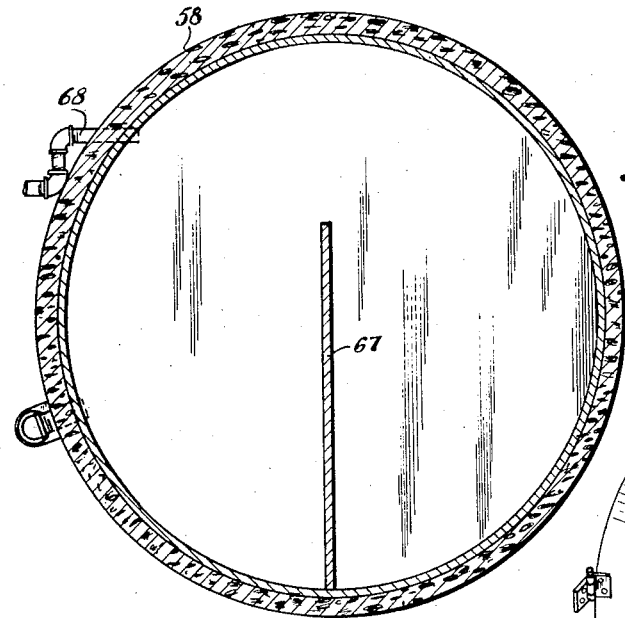
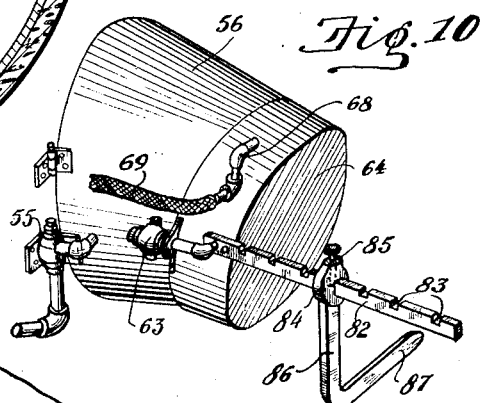
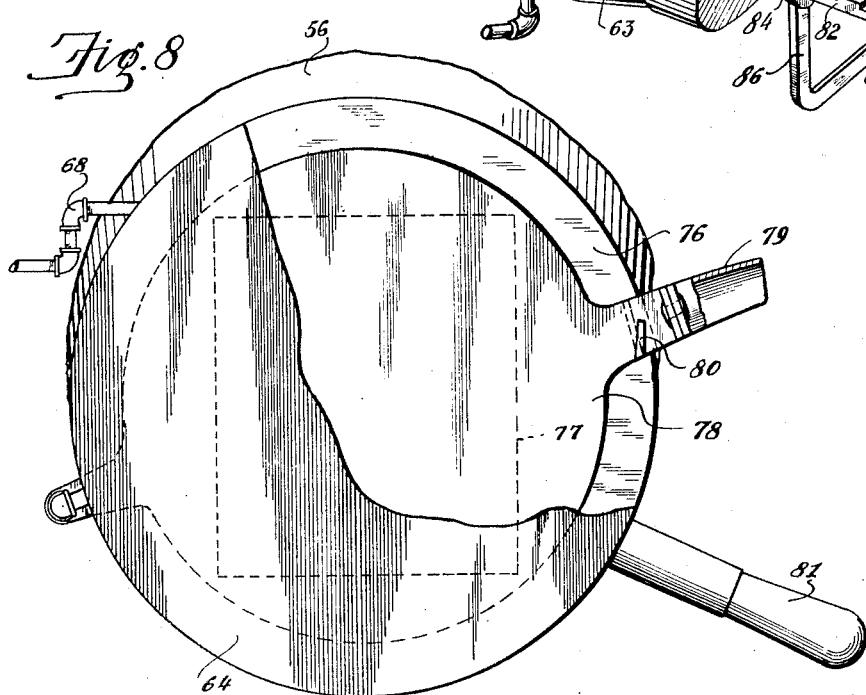
INVENTOR
John E. Dungan
BY Frease, Merkel, Saywell and Bond.
ATTYS.

UNITED STATES PATENT OFFICE.

JOHN E. DUNGAN, OF CANTON, OHIO, ASSIGNOR, BY DIRECT AND MESNE ASSIGNMENTS, OF SEVEN-SIXTEENTHS TO WALTER S. BRYSON, ONE-SIXTEENTH TO BENJAMIN F. BONE, ONE-SIXTEENTH TO FRANK M. HOWARD, ONE-SIXTEENTH TO JAMES A. SCHAUB, ONE-SIXTEENTH TO ALLEN C. SCROGGINS, JR., ONE-SIXTEENTH TO H. J. ZINK, AND ONE-SIXTEENTH TO EVERETT E. KOONTZ, ALL OF MOUNDSVILLE, WEST VIRGINIA.

MACHINE FOR DISPENSING SEMISOLID SUBSTANCES.

1,384,310. Specification of Letters Patent. Patented July 12, 1921.

Application filed November 15, 1919. Serial No. 338,160.

*To all whom it may concern:*

Be it known that I, JOHN E. DUNGAN, a citizen of the United States, residing at Canton, in the county of Stark and State of Ohio, have invented a new and useful Machine for Dispensing Semisolid Substances, of which the following is a specification.

The invention relates to apparatus for storing and dispensing ice cream, ices, sherbets and similar semi-solid substances and has more especial reference to apparatus of this character arranged to be located beneath the counter of a soda fountain and so constructed that the ice cream or other substance contained therein is not touched by the hands of the operator.

The objects of the invention are to provide an apparatus of the character referred to which will keep the ice cream or other similar semi-solid substance stored therein, in good condition, and from which the ice cream or other semi-solid substance may be economically and sanitarily dispensed; to retain the ice cream or other semi-solid substance stored therein in a hardened or nearly solid condition and at the same time to provide means for easily handling the same by the dispensing apparatus; and to provide means whereby the ice cream is kept out of contact with the outer air and dispensed from the apparatus without coming into contact with the hands of the operator, and in which the ice and ice cream are kept sealed from the outer air at all times, thus making a great saving in the amount of ice used and dispensing with the inconvenience and waste of frequently refilling the tank with ice, and preventing shrinkage of the ice cream.

Other and more specific objects are to provide an apparatus of this character in which the ice cream is dispensed from the container by means of a fluid controlled plunger which may be automatically operated to dispense a predetermined amount of ice cream, to provide means for automatically cutting off the fluid pressure when the container is emptied, to provide a temporary or shipping container so constructed that the ice cream may be easily removed therefrom, in a collapsible container, and placed within the container of the dispensing apparatus, to provide a circulation of brine around the container and dispensing head by means of a slight fluid pressure; to provide means for automatically lubricating the interior of the container to prevent frost from forming therein; and to generally improve and simplify apparatus of this character.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

Figure 1 is a longitudinal sectional view through a dispensing machine embodying the invention.

Fig. 2 is a section on the line 2—2, Fig. 1.

Fig. 3 is a perspective view of the piping through which the brine is circulated, also showing the fluid pipe and connecting mechanism which operates the plunger.

Fig. 4 is a longitudinal view through the receptacle or cylinder from which the ice cream is dispensed.

Fig. 5 is a detail sectional view of the valve which automatically controls the cutting off of compressed air to the cylinder when all of the ice cream has been dispensed therefrom.

Fig. 6 is a sectional detail view of the check valves which control the admission of brine to the circulating coils.

Fig. 7 is a detail sectional view of the cylinder and piston which is operated by back pressure from the dispensing receptacle and which controls the admission of compressed air to the device.

Fig. 8 is an end view of the cap and a portion of the dispensing head, parts being broken away for the purpose of illustration.

Fig. 9 is a vertical sectional view through the cap.

Fig. 10 is a perspective view of the dispensing head and cap showing the gage for measuring the amount of ice cream to be dispensed.

Fig. 11 is a detail perspective view of two of the vanes from the dispensing head.

Fig. 12 is a longitudinal sectional view of the shipping can showing the collapsible container filled with ice cream therein, the can being shown in position for filling the container or cylinder of the machine.

A practical embodiment of the invention is disclosed in the accompanying drawings, forming a part of this specification in which similar numerals of reference indicate corresponding parts throughout the several views.

The housing or casing of the machine is preferably substantially rectangular and is formed of the spaced outer and inner walls 1 and 2 respectively, the outer wall being preferably formed of wood and the inner wall of sheet metal, suitable insulating material 3, such as sheet cork or the like, being located between the spaced walls, an air space 4 being preferably provided between the insulation and the inner wall. With this construction of insulation an efficient nonconductor of heat is provided, which prevents the interior of the device from becoming warmed by the surrounding atmosphere.

Within the insulated casing thus formed is suspended a receptacle or cylinder 5 closed at its rear end, the forward end thereof extending through a suitable opening in the forward end of the casing. A piston 6 is slidably mounted within the cylinder 5 and provided with the ring groove 7 within which is mounted a heavy felt ring 8, which ring is lubricated with a fine oil, allowing the piston to move freely within the cylinder, the oil from the felt ring also slightly lubricating the walls of the cylinder in order to obviate any formation of frost upon the interior of the cylinder which might cause difficulty in forcing the ice cream from the cylinder.

The rear face of the piston is concaved as shown at 9 and a leather disk 10 is connected thereto by means of a metal ring 11 which is riveted or otherwise secured to the piston. The piston is provided with the central bore 12 enlarged at 13 and tapped at 14, a pin 15 being located through said bore and provided with an enlarged head 16 received in the enlarged portion 13 of the bore. A leather washer 17 is placed over the head 16 and a screw threaded plug 18 engages the tap portion 14 of the bore, holding the washer and head 16 firmly in place. A chain 19 is connected to the pin 15, the other end of the chain being connected to a valve 20 which controls the exhaust of compressed air from the cylinder, the operation of which will be later described.

Fluid under pressure, preferably compressed air from a compressor or other suitable source, is admitted through the pipe 21, a hand valve 22 being located in said pipe for the purpose of manually shutting off the air pressure if necessary. A three way valve 23 is located in the pipe 21, beyond the valve 22 and is arranged to be automatically operated as will be later described to cut off the admission of air to the coil 24 and allow the compressed air within the cylinder to exhaust through the exhaust port 25. A gage 26 of any usual and well known construction is placed in the pipe 23 for the purpose of registering the amount of air pressure admitted to the coil.

The coil 24 extends around the interior of the casing and then down as shown at 27 and into the rear end of the cylinder 5 as shown at 28, this pipe extending a short distance into the cylinder and being provided with the serrated inner end 29. With this construction the piston 6 is prevented from being moved into engagement with the rear end of the cylinder, thus allowing room to accommodate the chain 19 while the serrated end 29 of the pipe prevents the piston from entirely closing the inlet pipe, thus allowing air to escape through the serrated end of the pipe against the piston.

It should be understood that the lower portion of the interior of the casing is filled with brine, ice and salt being packed over the brine in the upper portion of the casing, over the cylinder and around the coil 24, the lid 30 of the casing being formed of the outer and inner walls 31 and 32 preferably of wood and metal respectively and spaced apart, a cork filling 33 being provided between said walls. When the interior of the casing is thus filled with brine and ice and the lid placed in position thereon the interior chamber of the casing is practically insulated against heat and the coil 24 being passed around through the ice, the compressed air is lowered to the proper temperature before being admitted to the cylinder, thus preventing any melting of the ice cream by contact with the compressed air.

The valve 20 to which the chain 19 is connected is located in a suitable valve seat 34 provided in the end of the pipe 35 and is provided with a valve stem 36 having a head 37 upon its opposite end. A coil spring 38 is located around the valve stem between the head 37 and the shoulder 39 formed in the pipe 35, this spring tending to normally hold the valve 20 in the closed position.

The pipe 35 communicates with the cylinder 40 within which is mounted a piston 41 provided with a piston rod 42, the upper end of which is slidably mounted through a bearing 43 provided upon the casing. A member 44 is carried upon the piston rod 42 and provided with spaced jaws 45 between which is located the crank 46 of the crank shaft 47, one end of said crank shaft being journaled in a suitable bearing 48 upon the casing, the other end of the crank shaft being operatively connected to the three way valve 23.

For the purpose of circulating brine around the cylinder or receptacle from which the ice cream is dispensed the pipe 49 is connected with a suitable pump, the lower end of said pipe extending downward into the lower portion of the interior of the casing and provided with a ball valve 50, the brine being taken in through this valve as will be later described. A short distance above the valve 50, the pipe 51 is connected with the pipe 49 and is provided with a ball valve 52 similar to the valve 50, this pipe 51 being connected to the coils 53 which pass around the receptacle or cylinder. To the opposite end of the coils 53 is connected a pipe 54 which connects with an open hinge valve 55 by means of which the head 56 is hingedly connected to the casing. This dispensing head is best illustrated in Fig. 4 and comprises the inner metal wall 57 and the spaced cork wall 58 between which walls an air space is formed by means of a plurality of vanes 59, each of which is provided with an inwardly disposed web 60, the webs of alternate planes being cut away at their forward and rear extremities respectively as shown at 61 and 62, thus allowing a complete circulation of brine around the head.

An open hinge valve 63 connects the cap 64 to the dispensing head, forming a hinge joint upon which the cap is pivoted to the head and forming a connection between the spaced walls of the head and the hollow interior of the cap, allowing the brine from the head to circulate through the interior of the cap. The cap is formed of sheet metal 65 covered with sheet cork 66, the interior of the cap being divided into two communicating chambers by means of a central transverse wall 67 the upper end of which terminates at a point spaced from the inner wall of the cap thus allowing the brine to circulate through the cap.

A pipe 68 communicates with the upper portion of the interior of the cap at a point where the brine which has become slightly warmed, will enter, a flexible hose 69 being connected to said pipe and leading to the return pipe 70, which is located through the interior of the casing and communicates with the downwardly inclined brine discharge pipe 71, the lower end of which terminates in an open end at a point spaced from the bottom of the interior of the casing.

The discharge pipe 71 extends upwardly a short distance above the point where the pipe 70 is connected thereto, the upper end thereof being closed and an air exhaust pipe 73 being connected near the upper end of the discharge pipe and extending through the walls of the casing allowing the warm air from the pump to escape therethrough, while the brine which is returned from the circulating system drains downwardly through the discharge pipe 71 and is returned to the interior of the casing.

It will be noted that the warm brine which has passed through the circulating system is returned at a point considerably higher than the point where the brine is drawn into the circulating system thus assuring that the coldest brine, which is necessarily located in the bottom of the casing, is drawn into the circulating system and the warm brine which is returned from the circulating system is discharged at a higher point within the casing.

A pair of spaced cutting blades 75, located at right angles to each other and preferably inwardly curved, are attached to the inner end of the dispensing head, these blades being for the purpose of cutting the column of ice cream as it is forced forwardly into the dispensing head from the receptacle or cylinder. Where the ice cream is in a nearly solid state, such as is preferable for serving, it has been found that by thus cutting the column before it enters the dispensing head the ice cream is more easily forced into the dispensing head.

Attention is called to the peculiar shape of the dispensing head, this particular shape of head having been found by experience to be best adapted for dispensing ice cream in a nearly solid state. The shape of this head might be described as approaching that of the frustum of a cone the base and apex of which are cut off at angles to each other. It will be seen that the lower edge of the head is horizontal and located in alinement with the lower edge of the receptacle or cylinder while the upper edge of the head is considerably longer than the lower and is inclined downwardly at a considerable angle, the outer end of the head being located in a plane extending downwardly and rearwardly.

An end plate 76 is provided at the outer end of the dispensing head and is provided with an aperture 77 preferably square as shown, through which the ice cream is forced in a rectangular column as it is dispensed from the machine. Pivoted upon the hinge 63, which carries the cap, is a cut off blade 78, preferably in the form of a disk as shown, and provided with an operating handle 79 arranged to be received into the slotted keeper 80 upon the cap, when the parts are in the closed position. The handle 79 of the cut off blade is off-set sufficiently to be located in the path of the oparating handle 81 of the cap and is preferably channel shaped as shown in order that the two handles may be grasped together by the hand of the operator.

In operating the cap and cut off to open the same, the handle of the cap is grasped and pulled upwardly swinging the cap upon its hinge. When the cap has partially opened the handle thereon will engage the handle of the cut off blade swinging the cut off upwardly into the open position. It will be seen that the cap thus opens ahead of the cut off blade. The two handles are thus located together when the cap and cut off blade are in the open position, and when it is desired to close the cap the two handles are grasped together by the hand of the operator and swung downwardly, the cut off blade thus moving ahead of the cap. As the handle of the cut off blade engages the keeper 80, further downward movement of the cut off blade will be stopped while the handle of the cap may be continued downward to the closed position of the cap.

For the purpose of predetermining the amount of ice cream to be dispensed from the machine at any one time, a gage is provided upon the dispensing head. This gage includes a rod 82 which is carried by the cap 64 and arranged to be rotated upon its longitudinal axis when the cap and cut off blade are moved. This rod is provided at spaced intervals with notches 83 corresponding to the different amounts of ice cream which may be dispensed, such as a plate, a half pint, pint or quart. A collar 84 is slidably mounted upon the rod 82 and provided with a spring pressed button 85 arranged to engage the notches 83. A downwardly depending arm 86 is carried by the collar 84 and provided with an angularly disposed finger 87 which is arranged to be located in the path of the column of ice cream emerging from the dispensing head. It will be seen that as the cap and cut off blade are swung into the open position the rod 82 will be rotated or rocked swinging the finger 87 upwardly into the path of the column of ice cream.

In Fig. 12 is illustrated the carrier or receptacle in which the ice cream is shipped and from which it is removed to be placed within the cylinder 5 of the machine. This receptacle is preferably in the form of an open ended cylinder 88 provided near its lower end with an inwardly disposed downwardly inclined annular flange 89, a removable disk 90, provided around its periphery with an angularly disposed annular flange 91, forming the bottom of the receptacle. An annular flange 92 is provided around the exterior of the receptacle at a point spaced a short distance from the upper end thereof. The ice cream is shipped in these receptacles or carriers and kept therein until placed within the cylinder of the dispensing apparatus, the cream being contained within a collapsible container 93 the upper end thereof being closed as shown at 94 while the lower end is provided with an inturned flange 95.

When it is desired to fill the cylinder 5 of the dispensing apparatus with ice cream, the fastening devices 96 upon the dispensing head are opened and the dispensing head is swung to one side upon its hinge. The upper open end of the receptacle 88 is then placed within the mouth of the cylinder, the annular flange 92 limiting the distance which the carrier is inserted within the cylinder. By placing the hand within the other end of the carrier and against the disk 90, the ice cream within the collapsible container 93 may be slid into the cylinder after which the carrier 88 and disk 90 are removed from the dispensing apparatus and the dispensing head closed and fastened. The machine is then in condition for operation to dispense the ice cream in any desired predetermined quantities.

The cylinder 5 is suspended within the interior of the casing between the front and rear rings 97 and 98 respectively, which rings are connected together by the tie rods 99. The front ring is supported within the front wall of the casing while the rear ring is supported upon a bracket 100. A beveled forward face 101 is provided upon the ring 97 forming an annular pocket to receive the collapsible container as it is forced out of the cylinder with the ice cream, the blades 75 guiding the collapsible container into the annular pocket and out of the path of the cream, the collapsible container being thus telescoped and forced into this annular pocket.

In the operation of the dispensing apparatus above decribed, assuming that the cylinder has been filled with ice cream and the interior of the casing filled with brine and ice, the operator first sets the gage upon the dispensing head for the desired quantity of ice cream to be dispensed. The handle 81 of the cap is then grasped and swung upwardly engaging the handle 79 of the cut off blade, the cut off blade following the cap into the open position allowing the ice cream to be forced through the aperture 77 in the end plate 76 of the dispensing head.

in a rectangular column, by means of the compressed air actuated plunger 6 within the cylinder.

The finger 87 being swung upwardly into the path of the column of ice cream, emerging from the dispensing head, by the opening of the cap, the outer end of the column of ice cream will contact with the finger 87 when the desired predetermined amount of ice cream has been dispensed from the head. When the operator sees that the desired amount of ice cream has issued from the dispensing head he immediately closes the cap and cut off blade as above described cutting off the column of ice cream which has emerged from the dispening head and allowing it to drop into the proper receptacle which may be placed beneath the dispensing head to receive the same.

When the last of the ice cream has been dispensed from the cylinder, the air pressure upon the plunger 6 will take the slack from the chain 19 opening the valve 20 and allowing the compressed air to pass through said valve into the cylinder 40 raising the plunger 41 therein and through the rod 42 and jaws 45 rocking the crank shaft 47, operating the three way valve 23 to shut off the admission of compressed air to the coils 24.

When a new container of ice cream is placed within the cylinder the plunger 6 will be forced back through the cylinder to the initial position forcing the air from the cylinder through the pipe 27 and coils 24 and exhausting the same through the exhaust aperture 25 in the three way valve 23. After the machine has been filled and the dispensing head closed and fastened the piston rod 42 is pushed down into its normal position operating the three way valve 23 by means of the crank shaft 47 and allowing compressed air to again pass from the pipe 21 to the coils 24 and through the pipe 27 to the cylinder.

It will thus be seen that with my improved dispensing apparatus the ice cream is served from a sealed receptacle without coming into contact with the hands of the operator and without requiring the opening of the receptacle after the ice cream has been placed therein, until all of the ice cream has been served therefrom. It should also be noted that the operation of the piston within the dispensing cylinder is automatically controlled by the opening or closing of the cut off blade upon the dispensing head. Thus, all that is necessary to dispense ice cream from the apparatus, is to open the cap and cut off blade and when the desired quantity of ice cream has been dispensed close the cap and cut off blade, it not being necessary for the operator to operate any levers, pedals or other mechanism to start or stop the machine.

I claim:—

1. A machine for dispensing semi-solid substances including a container open at one end, a cut off plate normally closing the open end of the container and a fluid pressure operated piston within the container for forcing the contents from the container when the cut off plate is opened.

2. A machine for dispensing semi-solid substances including a container open at one end, a cut off plate normally closing the open end of the container and a piston within the container for forcing the contents from the container said piston being arranged to be automatically operated when the cut off plate is opened, and to be automatically stopped by the closing of the cut-off plate.

3. A machine for dispensing semi-solid substances including an open ended cylinder, a fluid pressure operated piston within the cylinder for forcing the contents from the cylinder, a cut-off plate normally closing the open end of the cylinder and means for admitting a cold fluid to the cylinder, to operate the piston when the cut-off plate is opened.

4. A machine for dispensing semi-solid substances including a cylinder, a fluid pressure operated piston for forcing the contents from the cylinder, a cooling coil, and means for admitting fluid under pressure through said coil to the cylinder.

5. A machine for dispensing semi-solid substances including a container open at one end, a closure therefor, and a plunger within the container for forcing the contents therefrom through said open end, said plunger arranged to be operated by the opening of the closure and to continue to operate during the time the closure is open and arranged to be stopped by the closing of the closure.

6. A machine for dispensing semi-solid substances including a container provided with a discharge opening, means for forcing the contents of the container through said opening, a cap slidably movable across said opening and a cut off member slidably movable across the opening, the cut off member arranged to follow the cap in opening and to precede the cap in closing.

7. A machine for dispensing semi-solid substances including a container, an outwardly tapered, downwardly disposed dispensing head thereon, the outer reduced end of the head being inclined downwardly and rearwardly and provided with a discharge opening, means for closing said opening and means for forcing the contents of the container through the opening when the closing means is opened.

8. A machine for dispensing semi-solid substances including a casing adapted to contain brine, a cylinder located in said casing, a dispensing head upon said cylinder, a tortuous passage provided around said head, a hollow cap upon said head and means for forcing brine around the cylinder, through said tortuous passage, and through the hollow cap.

9. A machine for dispensing semi-solid substances including a casing adapted to contain brine, a cylinder located in the casing and open at one end, a dispensing head provided with spaced walls, located adjacent to said open end, and provided with a discharge opening, a hollow cap normally covering the discharge opening, and communicating with the head, means for forcing the contents of the cylinder through the discharge opening when the cap is opened, a coil located around the cylinder and connected to the head, a return pipe connecting the cap with the interior of the casing and means for forcing brine from the casing through the coil, around the head, through the cap and through the return pipe to the casing.

10. A machine for dispensing frozen substances including a cylinder surrounded by a cooling chamber and provided with a discharge opening, a plunger located in the cylinder and a fibrous lubricating ring located around the periphery of the plunger and adapted to lubricate the interior of the cylinder to prevent frost from forming directly upon the interior walls of the cylinder.

11. A machine for dispensing semi-solid substances including a cylinder, a fluid pressure operated piston for forcing the contents from the cylinder and means for cooling the fluid before it is admitted to the cylinder.

12. A machine for dispensing semi-solid substances including a cylinder surrounded by a cooling chamber, a fluid pressure operated piston for forcing the contents from the cylinder and a fluid pressure pipe leading into and coiled around the interior of the cooling chamber and communicating with the cylinder.

13. A machine for dispensing semi-solid substances including a container open at one end, and adapted to contain a column of semi-solid substance, a fluid pressure operated piston within the container engaging the inner end of said column, for forcing the same from the container, and a cut-off plate at the open end of the container engaging the outer end of the column, the piston arranged to be automatically operated by the fluid pressure to force the column from the container when the cut-off plate is opened and to be automatically stopped when the cut-off plate is closed.

14. A machine for dispensing frozen substances including a cylinder surrounded by a cooling chamber and provided with a discharge opening, a plunger located in the cylinder and means for lubricating the interior of the cylinder to prevent frost from forming thereon.

15. A machine for dispensing semi-solid substances including a casing adapted to contain brine, a cylinder located therein and having a discharge opening, a hollow cap covering said opening and means for forcing brine from the casing around said cylinder and through said hollow cap.

16. A machine for dispensing semi-solid substances including a casing adapted to contain brine, a cylinder located therein and provided with a discharge opening, a hollow cap normally covering the discharge opening, a coil located around the cylinder and communicating with the cap, a return pipe connecting the cap with the interior of the casing and means for forcing brine from the casing through the coil and cap and through the return pipe.

17. A machine for dispensing semi-solid substances including a container, a piston therein for forcing the contents from the container, means for admitting fluid pressure to the container to operate the piston, a valve controlling the fluid pressure, an exhaust pipe connected with the container, a piston within the exhaust pipe, means connected to the last named piston for operating said valve and a normally closed valve within the exhaust pipe arranged to be automatically opened when the container is empty.

18. A machine for dispensing semi-solid substances including a container, a piston therein for forcing the contents from the container, means for admitting fluid pressure to the container to operate the piston, a valve controlling the fluid pressure, an exhaust pipe connected with the container, a piston within the exhaust pipe, means connected to the last named piston for operating said valve, and a normally closed valve within the exhaust pipe connected to the piston within the container and arranged to be automatically opened when said piston within the container reaches the limit of its forward movement.

19. A machine for dispensing semi-solid substances including a cylinder, a fluid pressure operated piston within the cylinder for forcing the contents from the cylinder, means for admitting fluid under pressure to the cylinder and means for cooling said fluid before it is admitted to the cylinder.

20. A machine for dispensing semi-solid substances including a container open at one end, a cut-off plate normally closing the open end of the container and a fluid operated piston within the container for forcing the contents from the container, said piston being arranged to be automatically operated by fluid pressure when the cut-off plate is opened and to be automatically stopped by the closing of the cut-off plate.

21. A machine for dispensing semi-solid substances including a container open at one end, a cut-off plate normally closing the open end of the container, a fluid pressure operated piston within the container for forcing the contents from the container when the cut-off plate is opened and means for cooling the fluid before it is admitted to the container.

In testimony that I claim the above, I have hereunto subscribed my name.

JOHN E. DUNGAN.